United States Patent [19]

Pedersen

[11] Patent Number: 5,234,098
[45] Date of Patent: Aug. 10, 1993

[54] CONVEYOR FOR INDIVIDUAL PIECES OF FOOD

[75] Inventor: Bjorn H. Pedersen, Randers, Denmark

[73] Assignee: Scanvaegt A/S, Arhus, Denmark

[21] Appl. No.: 980,296

[22] Filed: Nov. 23, 1992

[30] Foreign Application Priority Data

Nov. 22, 1991 [DK] Denmark ............... 1909/91

[51] Int. Cl.$^5$ .............................. B65G 47/19
[52] U.S. Cl. .................. 198/533; 198/803.16; 198/836.3
[58] Field of Search ............. 198/533, 611, 803.16, 198/836.3

[56] References Cited

U.S. PATENT DOCUMENTS

| | | | |
|---|---|---|---|
| 2,658,286 | 11/1953 | Spurlin | 198/778 X |
| 2,873,019 | 2/1959 | Kay et al. | 198/803.16 X |
| 2,911,345 | 11/1959 | Swenson | 198/778 X |
| 2,941,651 | 6/1960 | Hutter et al. | 198/803.16 X |
| 3,049,215 | 8/1962 | Hutter et al. | 198/803.16 X |
| 3,318,439 | 5/1967 | Sullivan | 198/778 X |

Primary Examiner—D. Glenn Dayoan
Attorney, Agent, or Firm—Antonelli, Terry, Stout & Kraus

[57] ABSTRACT

In particular in the food industry it is needed to provide a regular stream of in themselves irregular pieces, e.g. for weighing and packing, from a store of partly congealed deep frozen food. According to the invention the randomly discharged pieces from the store are delivered to the central area of a revolving table, immediately above which there is disposed an essentially stationary spiral-shaped body which due to the rotation of the table conducts the pieces outwards, thereby increasing their mutual distance, in order for them to be discharged in a single file to a conveyor. The spiral-shaped body is supported and driven to perform a horizontal shaking movement whereby disintegrating congealed lumps of food, so that their constituent parts may equally be distributed evenly along the spiral track. In case the pieces at full capacity are discharged without mutual separation such a separation may be obtained by discharging them to a conveyor having a speed which is faster than the peripheral speed of the rotating table.

3 Claims, 1 Drawing Sheet

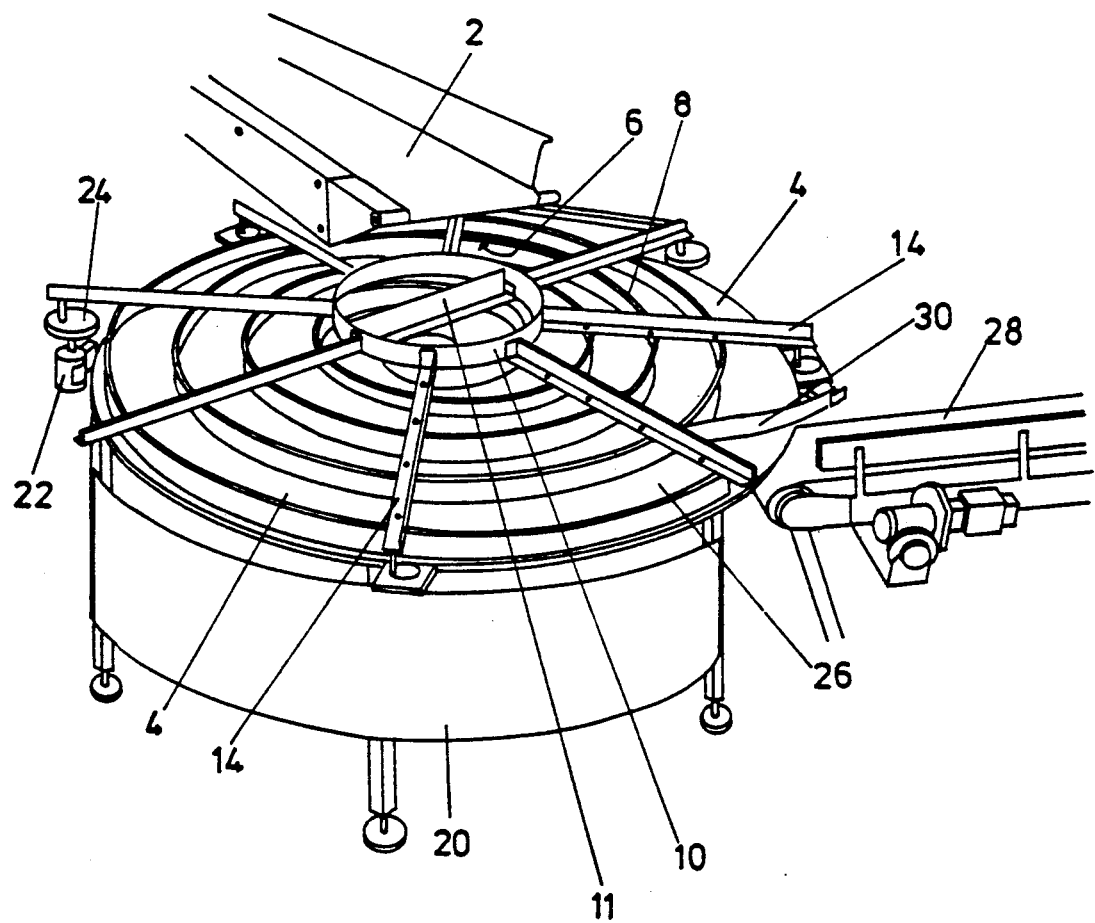

CONVEYOR FOR INDIVIDUAL PIECES OF FOOD

BACKGROUND OF THE INVENTION

The present invention is generally related to a process for receiving pieces or units of food from bulk storage and to distribute them with a regular spacing on a conveyor. The problem of randomly supplied units which have to be ordered has been known with particular products and specialized solutions are known. However, in the present invention a special type of product is considered which causes particular problems in connection with the need for spacing the items, in particular when supplying these to a dynamic weighing unit before they are automatically sorted for different receiving stations along a conveyor leading from the the weighing unit. In particular, various kinds of food pieces are considered, e.g. fillets of fish which have to be transferred to the weighing unit while frozen from random storage conditions and in which the pieces may adhere more or less to each other, forming congealed lumps. It may be necessary to subject the lumps of food to mechanical forces in order to disintegrate them into food pieces which may then be steered into a single file and accelerated towards the weighing unit. The pieces may have very irregular shapes and be of differing dimensions irrespective of adhesion, and the apparatus used until now for solving the problem has been both inefficient and expensive. Furthermore it has been a definite problem that in order to increase the certainty of separation between the pieces it has been necessary to spend so much time that the frozen pieces have enough time to thaw before they are delivered from the conveyor to the receiving station which is usually a packing station. The packed pieces pass along to the next station while being kept frozen, and it is preferable that they are not subjected to thawing at any stage.

OBJECTS OF THE INVENTION

Accordingly, it is an object of the invention to provide a unique process and apparatus which is efficient and of reasonable cost and fast acting in its separating the pieces from the lumps and in forming a single file of pieces with a desired spacing while performing this essentially in a single stage.

It is another object of the invention to provide a unique type of apparatus which will perform this task of disintegrating lumps and distribute all pieces evenly on a conveyor.

BRIEF DESCRIPTION OF THE DRAWING

FIG. 1 is a schematic drawing in perspective representation of a preferred embodiment of the invention for handling firm, non-sticky but possibly congealed pieces.

DETAILED DESCRIPTION OF THE PREFERRED EMBODIMENT

Referring to FIG. 1, there is shown a feed conveyor 2 onto which may be unloaded batches of material or a continuous stream of unsorted pieces, in particular frozen and partly congealed lumps of food. Some of these lumps may be broken up into smaller pieces by the mere unloading onto the feed conveyor. The discharge end of the conveyor 2 is disposed above the central area of a revolving circular table 4 on top of which there is disposed a stationary spiral-shaped body 6 constisting of a smooth strip 8 put on edge which is joined in the central area to a ring 10 which forms a circular receiving area and which has a diametrical vertical strip 11 across it. The ring 10 is connected to a number of radial arms 14 which support the turns of the spiral strip. This strip is preferably made of a plastic material and it rests against the surface of the circular table 4 which is preferably made of metal.

Connected to the chassis 20 there is a gear motor 22 which drives the end of a radial arm 14 via an excentric 24. More than one such drive is provided around the periphery, and together they impart a paracyclic movement to the whole spiral-shaped body 6 while sliding on the table 4 such that every point of the spiral-shaped body is moved around corresponding to the movement of the excentric 24 and associated drives. The excentrics are driven at such a speed that the movement is given a strong shaking character.

At the peripheral discharge opening 26 of the spiral-shaped body 6 there is disposed a tangentially directed conveyor 28, and between the feed end of this conveyor and the penultimate turn of the spiral there is disposed a scraper blade 30 consisting of a leaf spring which may remain connected to the spiral-shaped body even though its inner end participates in the paracyclic movement of the spiral. The conveyor carries the discharged pieces in a single file to e.g. a weighing station for subsequent further sorting according to weight. The congealed pieces to be treated are loaded onto the feed conveyor 2 in a reasonably regular but otherwise uncritical fashion in such a way that the supply corresponds approximately to the capacity of the conveyor itself. As mentioned above the pieces may be supplied to the conveyor 2 in larger or smaller lumps, but normally the mere unloading from e.g. a crate will separate the larger lumps so that the remaining lumps will not be bigger than still permitting their passage through the ring area 10. The ring itself and the strip 11 across it also contribute to the breaking-up of lumps, and it is without importance if smaller lumps spill over the edge of the spiral strip during this process.

Both lumps and individual pieces will fall through the ring 10 and onto the table 4 which revolves counterclockwise whereby these pieces under influence of friction are led to follow a spiral path between the turns of the spiral strip. Furthermore the pieces, but more particularly the lumps because of their larger dimensions, will be subjected to the shaking and beating movement which is caused by the paracyclic movement of the spiral-shaped body. This movement manifests itself as both lengthwise and crosswise movements with respect to the spiral path, and in particular the sideways movement having the character of a beating movement will further disintegrate the lumps of congealed pieces. This influence is maintained all the way during the passage of the pieces along the spiral path, and with suitable dimensioning enables the discharge of a minimum of congealed lumps to the conveyor.

An important property of the apparatus is that the pieces which are moved outwards in the spiral track at all times meet areas with a higher speed of the supporting table 4. This provides the pieces with a continuous, moderate acceleration which gradually increases their mutual distance concurrently with the gradual thinning of the number of lumps so that the pieces just reach the outer periphery in a single file. It will be noticed that this very important accelerating function is obtained simultaneously with the other desired function, that of breaking up the lumps which is also continuous along the spiral path.

When the apparatus is driven to maximum capacity, i.e. with such a supply of pieces that they are only brought into line but not with any spacing, the removing conveyor 28 should be faster than the peripheral speed of the table at the point of discharge, in order thereby to create the desired spacing between the pieces. The relative speeds should adjusted according to the largest lengthwise extent expected of the pieces, in case they are of varying dimensions.

The embodiment shown may be modified in many ways, e.g. by enabling adjustment of the movements involved, including the cycle frequency and amplitude of the movement of the spiral-shaped body 6. This may also make a simpler reciprocating movement which would, however, reduce its lump-breaking capacity. According to the kind of units to be handled by the equipment it may be advantageous to provide the table 4 with a surface of suitable friction, and it may be determined whether changes in the spiral strip 8 brings particular beneficial effects. A balance would have to be stricken in the case of lumps of pieces which have to be separated by the beating movement which is strong enough to perform this but not too noisy.

Even if a lump only disintegrates completely shortly before leaving the spiral track, i.e. after a fairly long series of impacts, the pieces may still separate sufficiently lengthwise due to the movement before delivery to the removing conveyor. This conveyor may be an accelerating conveyor in order that a lengthwise separation is increased.

The apparatus may be built such that its function is optimized with respect to its intended use, i.e. to separate the pieces to such a degree that lumps of congealed pieces will only exceptionally appear and may be removed manually or automatically for re-circulation. In particular when the apparatus is disposed in the correct manner it will be possible to work with a very short through-put time so that the pieces will have experienced minimal thawing. The most efficient way of using the apparatus is by adjusting the speed such that only at the end of the track do the pieces form a regular line. It should be noted that the transport movement in the spiral track is caused by a relative rotation between the table 4 and the spiral-shaped body 6, and in principle the invention would be equally realized by a complementary pattern of movement, i.e. where the spiral-shaped body is rotated in relationship to a stationary table; it would still have to provide the beating movement as well, and discharge of the pieces from the apparatus is not quite as simple.

If it is not desired to let the spiral-shaped body rest on the table 4 it may be supported by the radial arms 14 such that they carry all the weight, e.g. by lengthening the arms in order to reach the frame of the apparatus. This would not preclude the spiral-shaped body from making the appropriate paracyclic movement.

What I claim is:

1. A process for converting a stream of randomly supplied units, in particular hard, frozen pieces of food, consisting of individual pieces and possibly lumps of congealed pieces, into a single file of spaced pieces, comprising supplying the pieces or lumps of pieces to the centre of a revolving table above which there is provided a stationary spiral-shaped body which due to the rotation of the table conducts the centrally supplied pieces outwards while increasing the distance between the pieces and causing disintegration of lumps of pieces, said pieces being discharged from the outer end of the spiral to a discharge conveyor, the spiral-shaped body being forced to perform such lateral movements that its walls subject the pieces or lumps to a sideways shaking for breaking any lumps.

2. An apparatus for use in the process according to claim 1, comprising a revolving table with an essentiallly stationary spiral-shaped body disposed immediately above the table which due to the rotation of the table generates an outwardly conveying spiral track for pieces fed to a central area of the table and the spiral-shaped body, the spiral track having a tangential discharge in the proximity of which there are conveyor means for removal of the pieces fed from the spiral track, said spiral-shaped body being supported and controlled in such a manner that it may perform horizontal shaking movements, in particular paracyclic movements.

3. An apparatus according to claim 2, in which the spiral-shaped body consists of a strip on edge which is fixed to a number of radial arms and which preferably rests directly on the rotating table.

* * * * *